April 26, 1966 H. C. ANNAS ETAL 3,247,652
MEANS FOR MOUNTING FILTER UNITS IN AIR DUCTS
Filed Jan. 21, 1963 3 Sheets-Sheet 1

HENRY C. ANNAS
WILLIAM R. NIGHTINGALE
INVENTORS

BY Seed & Berry

ATTORNEYS

April 26, 1966 H. C. ANNAS ETAL 3,247,652
MEANS FOR MOUNTING FILTER UNITS IN AIR DUCTS
Filed Jan. 21, 1963 3 Sheets-Sheet 2

INVENTORS
WILLIAM R. NIGHTINGALE
HENRY C. ANNAS
BY Seed + Berry
ATTORNEYS

April 26, 1966 H. C. ANNAS ETAL 3,247,652
MEANS FOR MOUNTING FILTER UNITS IN AIR DUCTS
Filed Jan. 21, 1963 3 Sheets-Sheet 3
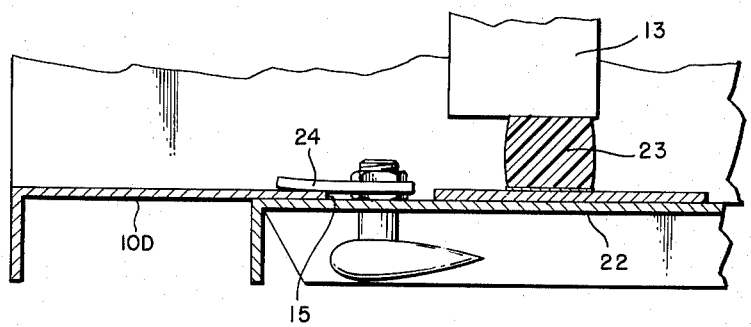
Fig. 6
Fig. 7
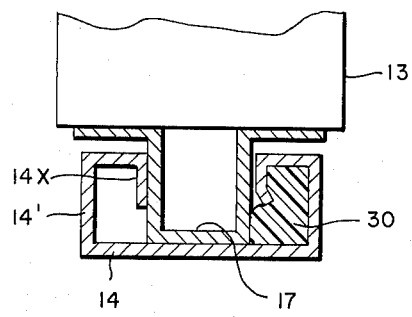
Fig. 8
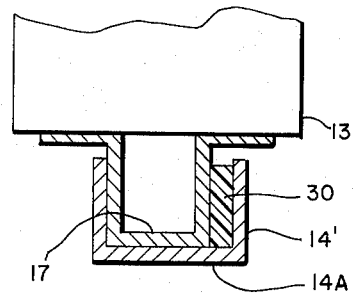
Fig. 9
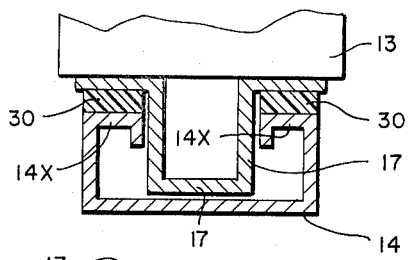
Fig. 10
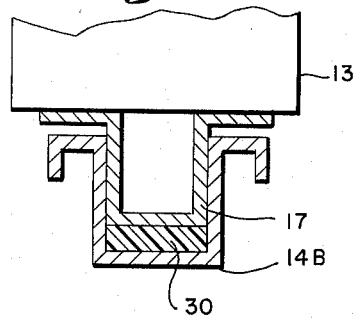
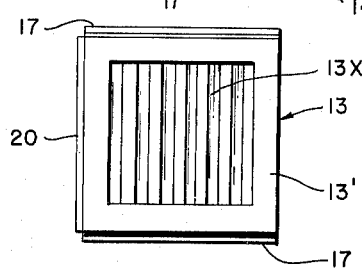
Fig. 11
INVENTORS
WILLIAM R. NIGHTINGALE
HENRY C. ANNAS
BY Seed Berry
ATTORNEYS

United States Patent Office 3,247,652
Patented Apr. 26, 1966

3,247,652
MEANS FOR MOUNTING FILTER UNITS
IN AIR DUCTS
Henry C. Annas, 6117 37th NW., and William R. Nightingale, 4002 36th Ave. W., both of Seattle, Wash.
Filed Jan. 21, 1963, Ser. No. 252,806
3 Claims. (Cl. 55—481)

This invention relates to improvements in installations employed for the forced delivery and circulation of air as, for example, in present day air conditioning systems of office buildings, stores, hotels, etc. More particularly the invention relates to those systems that employ banks of filter pads or units through which conditioned air is forcibly circulated.

It is the principal object of this invention to provide improved means in direct association with the frames in which the filter pads or units are removably and interchangably mounted, for the elimination of leakage or "blow by" of air about and between the filter units as applied in use in the air ducts of the air conditioning system.

It is also an object of the present invention to eliminate air "blow by" by the provision of novel guideways providing slots for functionally and slidably mounting the filter units in the air ducts, and in which guideways the filter banks may be slid edgewise in air tight contact therewith into and from the ducts for cleaning or replacement.

It is also an object to equip the novel channeled guideways with strips of resilient joint sealing material that are so positioned therein as to coact with guide ribs or rails on the frames of filter units to prevent the usual air leakage between guides and units.

Further objects and advantages of the invention reside in the details of construction of the filter units and their mounting guideways and in their relationship and use in the airduct, as hereinafter described.

In accomplishing the above mentioned and other objects of the invention, we have provided the improved details of construction, the preferred forms of which are illustrated in the accompanying drawings, wherein:

FIG. 6 is an enlarged horizontal sectional detail of parts as seen on line 6—6 in FIG. 1 showing the side wall opening of the casing and its closure plate.

FIGS. 7, 8, 9 and 10 are cross-sectional views showing different forms of guideways and various ways of applying and using the joint sealing strips therein.

FIG. 11 is a face view of one of the presently used filter units.

Before giving a detailed description of the present invention, it will be mentioned that it is presently a common practice, in the installation of air conditioning and heating systems, to install "package" equipment rather than built up equipment, except in very large installations. Package equipment usually incorporates a "draw-through" blower, a heating or cooling coil, a filter section and a mixing box equipped with dampers for outside and return air. These components are usually arranged in the order named, progressing down stream from the blower and are housed in rectangular, sheet metal casings which will form an integral part of the air duct system when installed.

Standard practise, heretofore, has been to slide panel type air filters into the casing unit through a narrow slot and to apply a cover plate over the slot. The filter units, in multiples are supported at top and bottom by metal channel iron guides and, abut together side by side to form a filter bank in the air stream.

The filters units are of necessity a loose fit in the channel guides and where they abut together, are frequently out of square, thus permitting air leakage between them. This leakage is called "blow by" and is detrimental to system efficiency. Filter banks as heretofore installed require room for a man to enter the air stream to change filters. This requires at least 30 inches of sectional space in air duct and a door in the side of the duct.

Manifestly, if high efficiency filters can be introduced into or removed from the air stream via slide and guide channels, considerable space can be saved over the built up filter plenum arrangement. Therefore, it has been the primary object of this invention to provide and install channel form guide rails in cooperating spaced relationship in the air duct and to equip the frames of the filter pads or units with ribs designed to be received and contained slidably in the rail channels. Also, to apply continuous strips of suitable gasketing material between the insides of the guiding rail channels and ribs of the filter units to eliminate possibility of any "blow by" in the duct. Gasketing strips also are applied to the ends of the frames of the filter pads or units to prevent air leakage between adjacent side members of filter units and between filter units and duct side walls.

Figure 1:
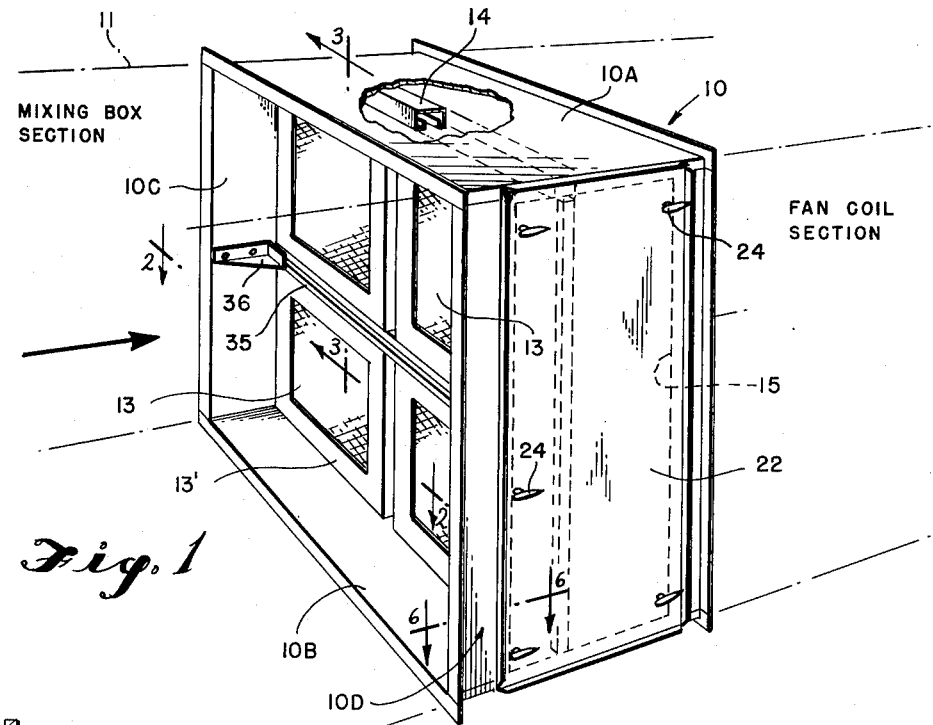
FIG. 1 is a perspective view of a casing or housing that is incorporated in a duct system and in which the improvements of the present invention are embodied.

Referring more in detail to the drawings:

In FIG. 1, 10 designates a rectangular housing or casing, in which banks of filter pads are slidably mounted for movement into and from the air stream by means embodied in the present invention. This casing 10 comprises top and bottom walls, 10A and 10B, and opposite side walls 10C and 10D. The casing is open at its ends and is interposed between a mixing box section 11 and fan coil section 12, which are shown in dash lines in FIG. 1.

The casing 10, as shown in FIG. 1, contains an upper and a lower bank of filter units; each unit being designated by reference numeral 13, best shown in FIG. 11.

Figure 3:
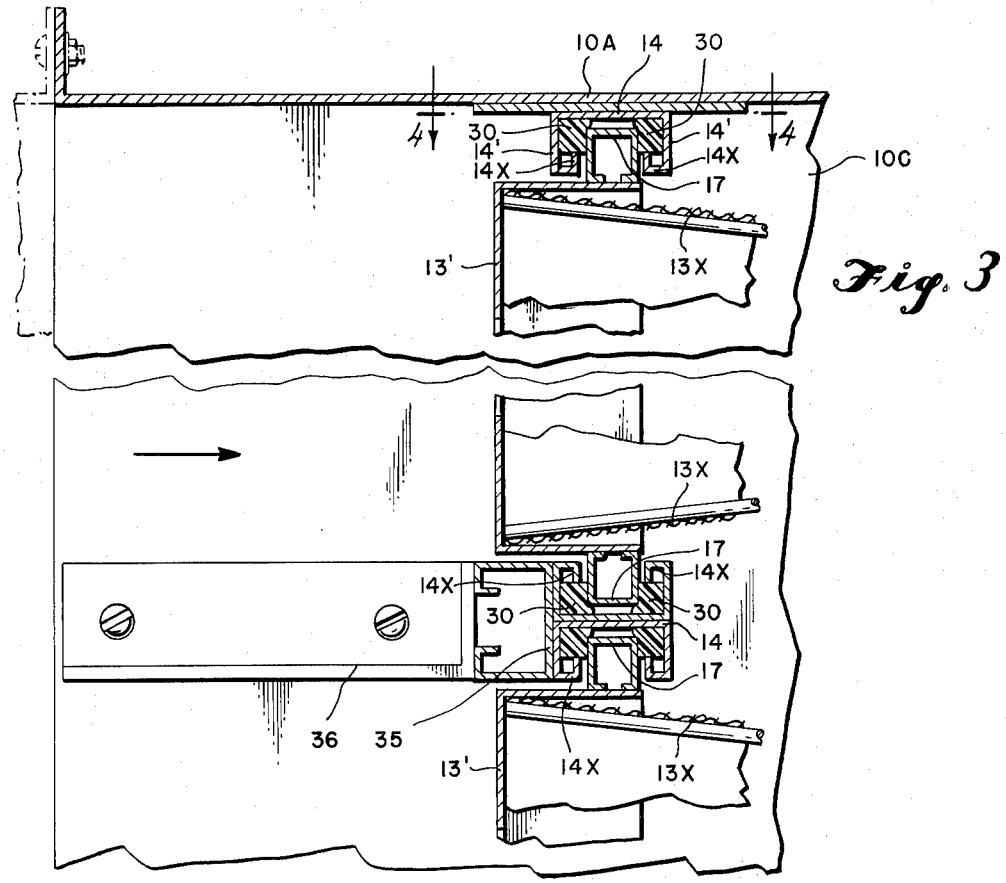
FIG. 3 is an enlarged vertical sectional detail of a part of the casing of FIG. 1, particularly illustrating the guideways in which filter banks or units are slid into and from the casing; the medial portions of the filter banks and casing being broken away in order to reduce the height of the view.

It has been shown in FIG. 3 that guide channels 14 are supported horizontally and transversely of the casing in the same vertical plane, in paired relationship, each pair to receive two filter units in edge to edge relationship between them, by entry through an opening 15 provided in one of the side walls of the casing as seen in FIG. 1.

Figure 2:
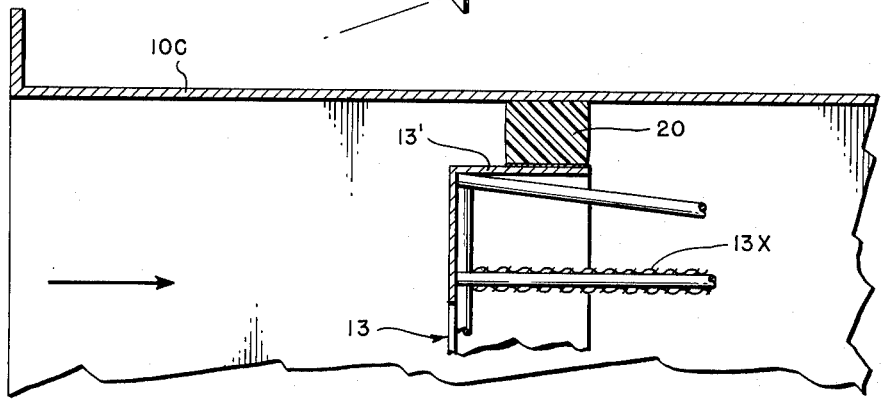
FIG. 2 is an enlarged, horizontal section taken on line 2—2 in FIG. 1, showing a portion of a side wall of the casing of FIG. 1 and the side edge portion of a filter unit frame as disposed in the casings.
Figure 5:
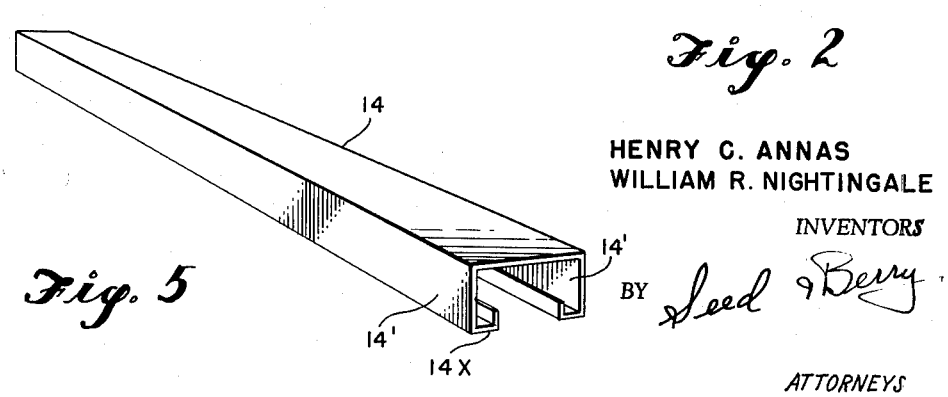
FIG. 5 is a perspective view of one of the channeled guideways, shown apart from the housing of FIG. 1.

Each filter unit 13 comprises an open rectangular angle iron frame 13', made up of rigidly joined opposite side, top and bottom members which frames mount air filtering units 13x within them. It has been shown on FIG. 3 that the top and bottom members of each frame are equipped lengthwise thereof with guide rails 17 that are so positioned as to be slidably received in the corresponding guide channels 14 for movement of the frames into and from the casing 10 through wall opening 15. One of the side wall members of each frame 13' is equipped lengthwise of its outer surface with a joint sealing gasket 20 as has been shown in FIG. 2. In the application of the filter units 13 to a pair of channeled guides for example, as to the top pair shown in FIG. 3, the sealing strip 20 which is adhesively secured to the frame of the first inserted unit, of the casing is engaged firmly against the side wall 10c. The second filter is then applied to the guideways and moved into place, causing its sealing strip 20 to be pressed firmly against the adjacent vertical side member of the first positioned filter unit 13.

The side opening 15 of the casing 10 is fitted with a closure plate 22 and this is provided as shown in FIG. 6 on its inside surface, with an air sealing strip 23, positioned to tightly press longitudinally against the adjacent side member of the filter unit frame to seal that joint against "blow by" of air. The closure plate 22 is suitably fitted about its edges to engage the casing in air sealed joints and it also is equipped with handle actuated locks or latches 24 for drawing it tightly into place and securing it when in closed position.

Figure 4:
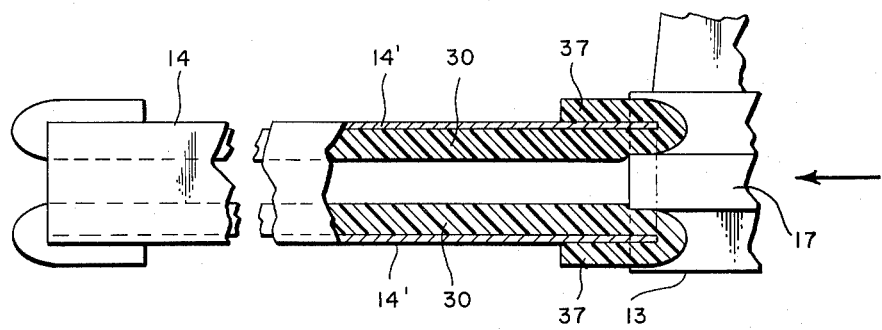
FIG. 4 is a horizontal section taken on line 4—4 in FIG. 3, showing the uppermost channeled guideway and joint sealing strips as employed therein.

A feature of the invention resides in the mounting of joint sealing strips 30 of gasket material, such as neoprene sponge rubber or the like, in the channeled guides 14 to prevent "blow by" of air past the guide ribs 17. It is to be observed by reference particularly to FIG. 3 that the guide channels 14 each have a base and parallel opposite side walls or legs 14' which have their outer longitudinal edge portions turned inwardly toward each other and then inwardly toward the base wall of the channel as at 14x. These inturned portions 14x holdingly engage the joint sealing strips 30 for sliding reception between them of the guide rails 17 of a positioned filter frames 13. The positioning of a filter frame 13 for sliding movement into a guide channel has been illustrated in FIG. 4.

The arrangement of the lower tier of filter units, as shown in FIGS. 1 and 3, is the same as the arrangement of these of the upper tier.

It is shown in FIG. 3 that the two guide channels 14 that are located between the tiers of filter units are placed back to back and are rigidly supported from a horizontal rail 35 that is supported at its ends, from the opposite side wall of the casing 10 by use of brackets 36.

The joint sealing strips 30 of material applied to guide rails and to filter unit frames may be any suitable compressible material such as the sponge rubber strips or the like. In its application to the guide rails 14, the ends of the joint sealing strips 30 are drawn outwardly from the channel and then folded back along and adhesively secured to the outside surfaces of the rail as at 37 in FIG. 4.

In FIGS. 7 to 10 we have illustrated alternative forms of guide rails that will serve the purpose in sealing the joints against air leakage. The guide rail 14 shown in FIG. 7 is substantially like those seen in FIG. 3 except that the channel that receives the guide rib 17 is slightly narrower and a joint sealing strip 30 is employed only at one side of the rail. The channeled guide 14a of FIG. 8 is of simple channel form with no inturned edge portortion 14x and the joint sealing strip 30 is applied along the inside of one of the side walls 14' of the rail.

The combination shown in FIG. 9 is substantially like that seen in FIG. 3 but the joint sealing strips 30 are applied along the top surfaces of the inturned flanges 14x of the channel. FIG. 10 shows a channel forming guide 14b that is substantially like that of FIG. 9 except narrower and the sealing strip 30 is applied flatly on the bottom of the channel 14b. FIG. 11 shows a filter frame 13 to be equipped on top and lower sides with guiding ribs 17 to coact with the guide rails 14 and with a joint sealing strip 20 applied to a side edge to engage the corresponding edge of a filter unit as positioned in the guideway or against the casing wall.

An advantage of the present construction resides in the fact that with the channeled guides 14 so applied in the casing 10, the filter units may be readily reversed if desired for flow of the air steam in either direction. Also, the opening 15 of the casing may be placed in either side wall. The filter units are individually removable for cleaning or replacement. Furthermore if it is more desirable, the joint sealing strips 30 of rubber, or the like, may be secured to the opposite sides of the guide ribs 17 instead of secured to the channel walls 14'.

Other advantages reside in adequate joint sealing to eliminate "blow by" of air past the filter banks by the present use of the joint gasketing strips 30 as seen in the various views of the drawings and more particularly in FIG. 3.

In FIG. 1 we have illustrated a bank of filters which is two units high and two units wide. It will be appreciated that the number of units both in height and width will vary depending upon the size of the system. The units may be in a single or plurality of rows both in a vertical and horizontal direction.

What we claim to be new is:

1. An air filtering mechanism comprising:
   (a) a rectangular casing interposed in and forming a part of an air duct, said casing having a top wall with a front edge, a bottom wall, a pair of side walls extending between said top and bottom walls, and open front and back walls providing an air inlet and an air outlet;
   (b) a plurality of channeled guide rails mounted in said casing parallel to said front edge and extending from one of said side walls to the other, said guide rails including top and bottom channeled guide rails and intermediate channeled guide rails, said top guide rail having a substantially flat base secured to said top wall and a pair of legs connected to and extending outwardly from said base toward said bottom wall so that said guide rail is open in the direction toward said bottom wall, said bottom guide rail having a substantially flat base secured to said bottom wall and a pair of legs connected to and extending outwardly from said base toward said top wall so that said guide rail is open in the direction toward said top wall, said intermediate guide rails extending across said casing medially of said open front to divide said casing into top and bottom compartments and including a pair of channeled guide rails each having a substantially flat base and a pair of legs connected to and extending away from said base, said bases of said intermediate guide rails being secured together in coextensive contact with each other and the legs of one of said intermediate guide rails extending toward said top wall so that said guide rail is open in the direction toward said top wall, and the legs of the other of said intermediate guide rails extending toward said bottom wall so that said guide rail is open in the direction toward said bottom wall, and the legs of all of said guide rails terminating in inturned flanges, said inturned flanges of each rail being spaced apart from each other to provide a longitudinal opening into the rail, at least one air sealing strip disposed completely within each of said channeled guide rails and secured between the base and one of the inturned flanges thereof;
   (c) a plurality of air filter units of rectangular formation within each of said compartments, said units each having a frame and filter material secured in the frame, each frame including a mounting rib secured to its top and bottom edges and extending the full width thereof, each mounting rib having a generally rectangular peripheral cross-section and being slidably received within the longitudinal opening of one of said guide rails in sealing engagement with the sealing strip located therein;

(d) one of said side walls of said casing having an opening in alignment with said guide rails through which said filter units may be removed from said casing; and (e) a removable closure for said last-mentioned opening.

2. An air filtering mechanism as recited in claim 1 wherein each filter unit has an air sealing gasket applied thereto along one of its vertical edges to its full length.

3. An air filtering mechanism as in claim 2 wherein the removable closure for said side wall opening mounts an air sealing gasket thereon that engages tightly with the adjacent vertical edge of the nearest filter unit to prevent air leakage between them.

References Cited by the Examiner

UNITED STATES PATENTS

| 764,922 | 7/1904 | Davis | 55—481 |
| 1,771,173 | 7/1930 | Greene | 55—502 X |
| 1,916,907 | 7/1933 | Sargent | 55—481 |
| 2,655,091 | 10/1953 | Geiger | 55—481 X |
| 2,908,348 | 10/1958 | Rivers et al. | 55—484 X |
| 2,935,157 | 5/1960 | First | 55—483 |
| 3,019,855 | 2/1962 | Engle | 55—352 |

FOREIGN PATENTS 748,901  5/1956  Great Britain.

ROBERT F. BURNETT, *Primary Examiner.*

HARRY B. THORNTON, *Examiner.*